(12) United States Patent
Horovitz et al.

(10) Patent No.: US 8,132,164 B1
(45) Date of Patent: Mar. 6, 2012

(54) SYSTEM, METHOD AND COMPUTER PROGRAM PRODUCT FOR VIRTUAL PATCHING

(75) Inventors: Oded Horovitz, Palo Alto, CA (US); Yona Hollander, Cupertino, CA (US)

(73) Assignee: McAfee, Inc., Santa Clara, CA (US)

( * ) Notice: Subject to any disclaimer, the term of this patent is extended or adjusted under 35 U.S.C. 154(b) by 1301 days.

(21) Appl. No.: 11/194,300

(22) Filed: Aug. 1, 2005

(51) Int. Cl.
*G06F 9/44* (2006.01)
(52) U.S. Cl. ...................................... 717/169
(58) Field of Classification Search .................. None
See application file for complete search history.

(56) References Cited

U.S. PATENT DOCUMENTS

| | | | |
|---|---|---|---|
| 7,784,034 B1 | 8/2010 | Dalcher et al. | |
| 2002/0065802 A1 | 5/2002 | Uchiyama | 707/1 |
| 2002/0070978 A1 | 6/2002 | Wishoff et al. | 345/811 |
| 2003/0056116 A1* | 3/2003 | Bunker et al. | 713/201 |
| 2004/0199763 A1 | 10/2004 | Freund | 713/154 |
| 2005/0015760 A1* | 1/2005 | Ivanov et al. | 717/168 |
| 2005/0076235 A1* | 4/2005 | Ormazabal et al. | 713/201 |
| 2006/0031755 A1 | 2/2006 | Kashi | 715/512 |
| 2006/0179484 A1 | 8/2006 | Scrimsher et al. | 726/23 |
| 2006/0184998 A1* | 8/2006 | Smith et al. | 726/3 |
| 2007/0112824 A1* | 5/2007 | Lock et al. | 707/102 |
| 2007/0260880 A1* | 11/2007 | Satterlee et al. | 713/164 |
| 2009/0205039 A1* | 8/2009 | Ormazabal et al. | 726/11 |

OTHER PUBLICATIONS

Press Release 181, "Finjan's Latest Security Update Includes Virtual Patch against Unpublished Vulnerability," http://www.finjan.com/company/newsroom/press_show.asp?press_release_id=181, Jun. 14, 2005.
Office Action Summary from U.S. Appl. No. 11/314,398 mailed on Aug. 20, 2009.
Notice of Allowance from U.S. Appl. No. 11/341,398 mailed on Mar. 22, 2010.
"Spying on COM Objects", Dmitri Leman, 1999.
"The Component Object Model: A Technical Overview", Sara Williams et al, Microsoft Corporation, 1994.
"Intrusion Prevention Systems: A Look Under the Hood" Leaders in High Speed Intrusion Prevention, http://www.charlotteissa.com/meetings/Intrusion_Prevention_Systems.pdf, printed Jun. 22, 2005, 95 pages.

* cited by examiner

*Primary Examiner* — Philip Wang
(74) *Attorney, Agent, or Firm* — Patent Capital Group

(57) ABSTRACT

A system, method, and computer program product are provided for virtual patching. Initially, information associated with at least one vulnerability of a computer application is collected. Further, at least one host interface is identified that is capable of being used to access the vulnerability. In use, data sent to the at least one host interface is analyzed to determine whether the data is unwanted, based on the information.

21 Claims, 4 Drawing Sheets

SYSTEM, METHOD AND COMPUTER PROGRAM PRODUCT FOR VIRTUAL PATCHING

FIELD OF THE INVENTION

The present invention relates to computer security software, and more particularly to patching security vulnerabilities.

BACKGROUND

Due to the ever-increasing amounts of unwanted data computer systems must be protected against, software updates for security programs have become a growing necessity. Specifically, unwanted data such as viruses, worms, Trojan horses, spyware, etc. is constantly being developed by attackers to intrude and sometimes even destroy computer systems. For example, the results of unwanted data has ranged from mild interference with a program, such as the display of an unwanted political message in a dialog box, to the complete destruction of data on a hard drive, and even the theft of personal information.

Many security programs have been created in order to provide the protection required by modern computer systems. For example, firewalls, intrusion detection software, scanners, etc. have been used alone and in combination in order to best guard computer vulnerabilities against all types of unwanted data. However, with increasing amounts of unwanted data constantly being developed by attackers to circumvent such security programs, continuous updates have become necessary for providing ample protection.

One type of update commonly provided by manufacturers of security programs includes patching. Patching is a method by which software updates for security programs are provided to computer systems utilizing such security programs, in order to protect the computer systems against newly discovered vulnerabilities. These patches generally include executable programs (or data that may be used by installation programs) that are run on the computer systems utilizing the security programs.

Due to the large number of updates needed to keep up with constantly discovered newfound computer system vulnerabilities, patching can become quite cumbersome. In particular, patching generally requires that all computer systems running the associated security program individually execute, or install, the patch. This results in an extremely time-consuming process. First, once a vulnerability is discovered, a patch must be created to protect the vulnerability. Then, the patch must be tested to make sure that it, in fact, protects the vulnerability. Finally, the patch must be distributed to all pertinent computer systems which must each install the patch individually and then reboot in order for the patch to operate.

For large corporations utilizing security software, the patching process may require the distribution and execution of a single patch to thousands of computers. In view of the vast number of patches that are created almost daily, this process becomes very inefficient. In addition, a network of computers, such as within a company or even over the Internet, will most likely be at risk for quite some time since full protection against the vulnerability is not provided until all computer systems install the patch. Furthermore, patches generally build on one another such that a latest patch requires all previous patches to have been installed. This may cause problems in and of itself if users of computer systems are not diligent in installing all patches.

To overcome the problems associated with patching, intrusion prevention systems have been created that employ behavioral blocking techniques. In these types of systems, continuous patching is not needed since signatures for matching specific processes and data are not used. However, since intrusion prevention systems only rely on recognized behaviors, protection is limited such that many vulnerabilities go unprotected.

Due to the inefficiencies of the foregoing patching and intrusion prevention methods, a more efficient method is needed which is capable of addressing vulnerability issues more quickly and effectively. There is thus a need for overcoming these and/or other problems associated with the prior art.

SUMMARY

A system, method, and computer program product are provided for virtual patching. Initially, information associated with at least one vulnerability of a computer application is collected. Further, at least one host interface is identified that is capable of being used to access the vulnerability. In use, data sent to the at least one host interface is analyzed to determine whether the data is unwanted, based on the information.

In one embodiment, the information may be collected from a software patch. In addition, an event may be initiated if the data is determined to be unwanted. Such event may include preventing the data from accessing the at least one host interface. Optionally, the event may include creating a software exception. As another option, the event may include suspending a thread executing the data. Further, the event may include terminating execution of a process associated with the data.

In another embodiment, the information may include public information. As an option, the information may be collected utilizing black box testing. The information may also be collected utilizing binary differentiation. Additionally, the at least one host interface may be identified utilizing a debugger. In another aspect, the at least one host interface may be identified utilizing a static analysis. Still yet, a closest host interface may be identified and only data sent to the closest host interface may be analyzed, when a plurality of the host interfaces is identified.

In yet another embodiment, the collecting, identifying and analyzing may be capable of being disabled. Furthermore, the collecting may include filtering the information and classifying the information. Specifically, the filtering may optionally include identifying a vulnerability name, severity level and/or affected platform. As another option, the identifying may include reproducing the vulnerability and determining a root cause of the vulnerability. In addition, a detection algorithm may also be created for utilization in detecting subsequent unwanted data.

DETAILED DESCRIPTION

Figure 1:
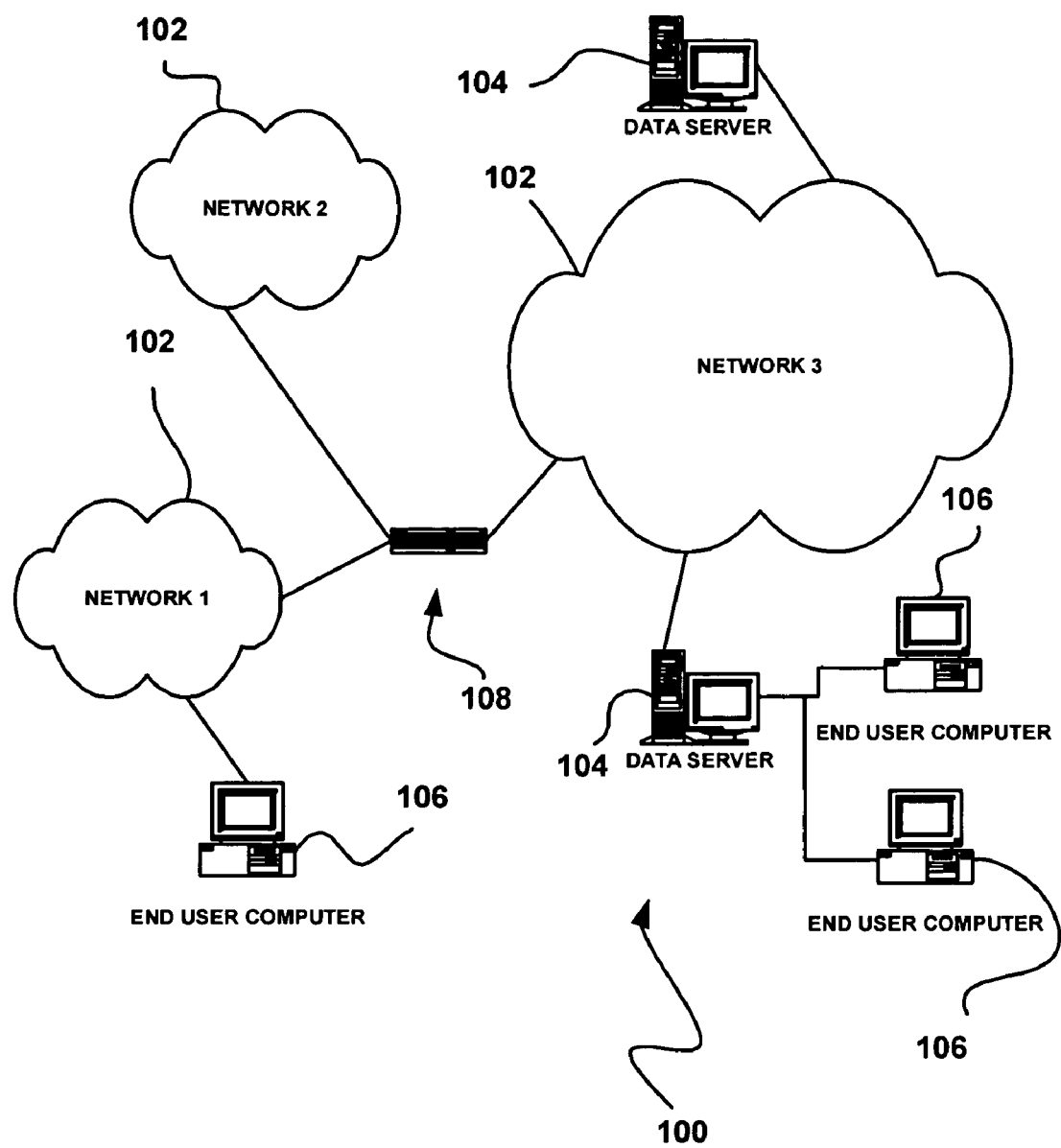
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are data server computers 104 which are capable of communicating over the networks 102. Also coupled to the networks 102 and the data server computers 104 is a plurality of end user computers 106. Such client computers 106 may each include a desktop computer, lap-top computer, mobile phone, hand-held computer, any component of a computer, and/or any other type of logic. In order to facilitate communication among the networks 102, at least one gateway or router 108 is optionally coupled therebetween.

It should be noted that any of the foregoing computers in the present network architecture 100, as well as any other unillustrated hardware and/or software, may be equipped with various security system features. For example, the various data server computers 104 and/or end user computers 106 may be equipped with security system hardware and/or software for protecting the various computers on any of the networks 102 against unwanted data. More information regarding optional functionality and optional architectural components associated with such feature will now be set forth for illustrative purposes.

Figure 2:
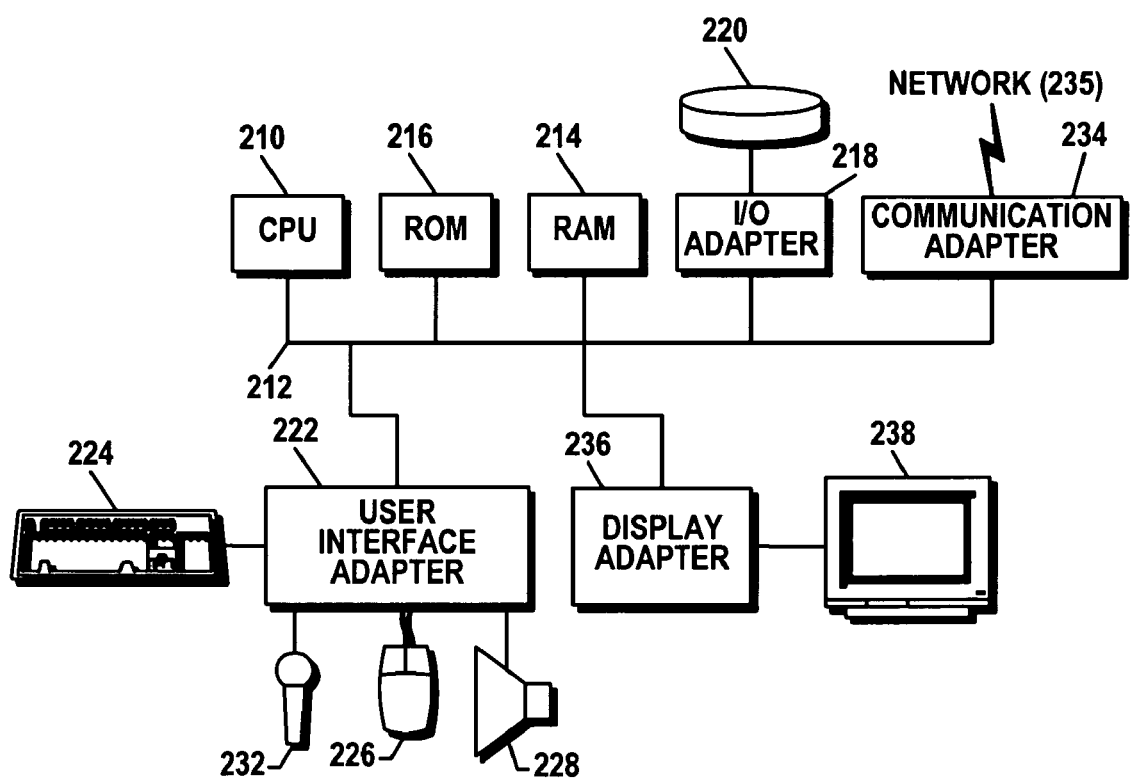
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
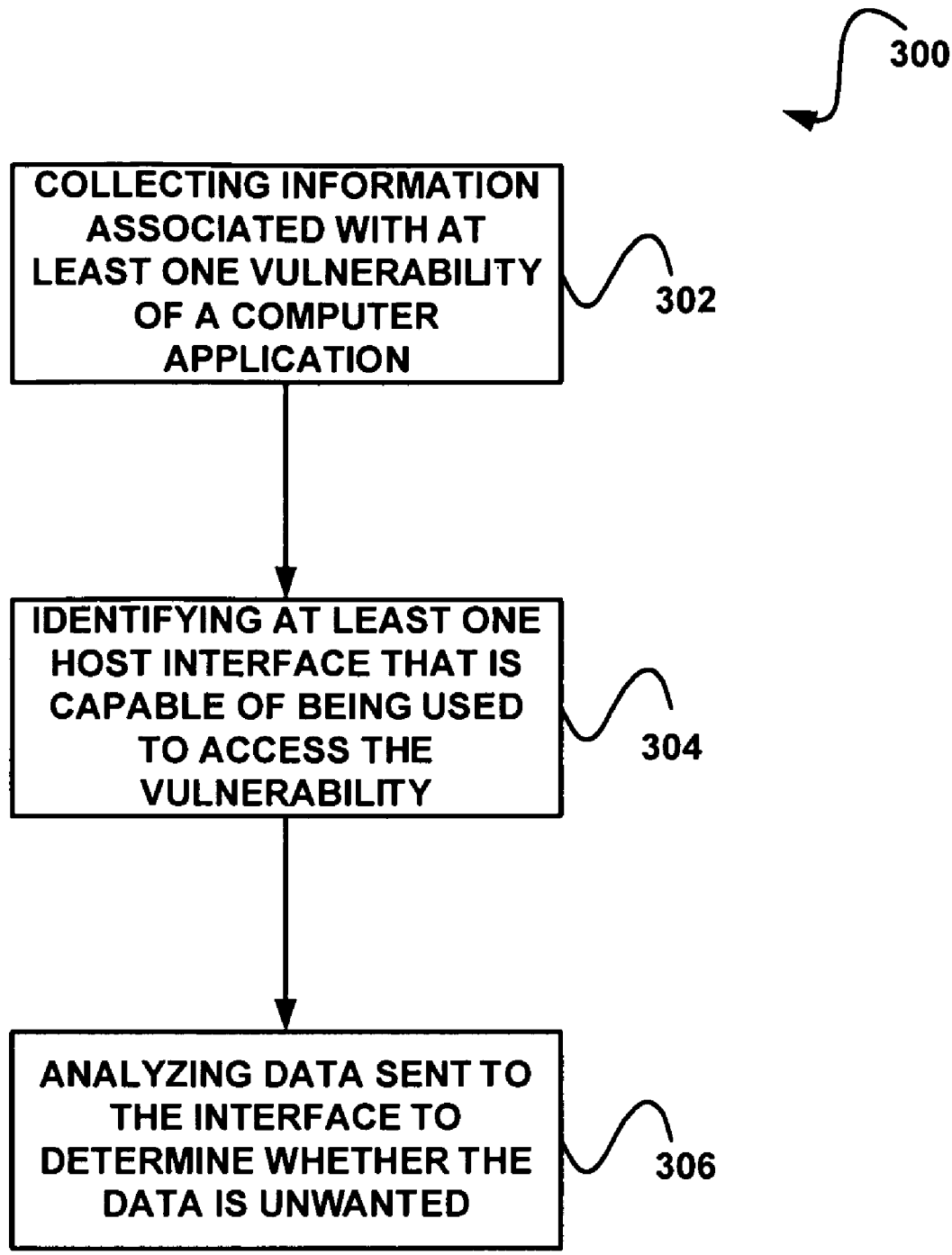
FIG. 3 shows a method for virtual patching, in accordance with one embodiment.

FIG. 3 shows a method 300 for virtual patching, in accordance with one embodiment. As an option, the present method 300 may be implemented in the context of the architecture and environment of FIGS. 1 and/or 2. Of course, however, the method 300 may be carried out in any desired environment.

Initially, information associated with at least one vulnerability of a computer application is collected, as shown in operation 302. For example, the information may be publicly available information collected from public resources (e.g. MICROSOFT Monthly Security announcements, full-disclosure mailing lists, etc.) that describe the vulnerability (e.g. name, source, process utilized for exploitation, code path/function utilized for exploitation, severity level, affected platform(s), vulnerable products, external references to exploit code, documentation on the computer application, etc.).

As another option, the information may be collected from a software patch associated with a vulnerability in a computer application. In one example, the information may be collected from the software patch utilizing black box testing. Black box testing may be utilized when the known information associated with the vulnerability includes a known exploit and a known result associated with the exploit. In general, black box testing may be used for collecting information about a vulnerability when there is no known information about the inner-workings of the vulnerability. In such a situation, the known exploit may be researched utilizing debugging methodologies in order to collect detailed information about the vulnerability. Just by way of example, the IDA PRO DISASSEMBLER and DEBUGGER made by DATARESCUE, Inc. may be utilized for collecting the information by way of a debugger as described hereinabove.

In another example, binary differentiation may be utilized for collecting the vulnerability information from the software patch. Binary differentiation includes the enumeration of all functions within two files: the first file being the software patch and the second file being the latest version of the computer application without the patch. For example, the latest version of the computer application may include the original computer application with all patches except the present patch from which information is being collected.

Once the functions for each are enumerated, two code trees are created such that one code tree is created for the enumerated functions of each file. The two code trees are then compared so that the content of each function in one tree is matched with content of a function in the other tree. In this way, the functions of each file can be mapped and only information concerning functions that have changed (or are new) in the patched file are collected. Just by way of example, such binary differentiation may be accomplished utilizing the SABRE BinDiff product by SABRE Security.

As an option, the vulnerability information collected in operation 302 may further include filtering the information and/or classifying the information. Examples of such filtering and classifying will be described in more detail with respect to FIG. 4.

After the information is collected in operation 302, at least one host interface that is capable of being used to access the vulnerability is identified, as shown in operation 304. The host interface may be any type of function or interface that serves as a gateway or access point to the vulnerability (e.g. vulnerable code in the computer application, etc.). As an option, the host interface may be identified utilizing a debugger. For example, a break may be placed in vulnerable code identified in the information collected in operation 302. Then, the code may be traced to identify the location in the code creating the vulnerability.

As another option, the host interface may be identified utilizing a static analysis to find the execution flow in the vulnerable application. For example, if the vulnerability is located within an executable file, the executable file may be run for identifying error messages, creating error log files, etc. In addition, if no exploit is known in association with the vulnerability, a debugger may be utilized for locating all code paths associated with functions leading to the vulnerable code.

Of course, it should be noted that any method may be utilized which is capable of identifying at least one host interface for accessing the vulnerability. In some embodiments, a plurality of host interfaces may be identified. In such a case, a closest host interface may be identified in operation 304. The closest host interface may be identified according to any number of criteria, such as a shortest code path to the vulnerability, a code path previously utilized for exploiting the vulnerability, etc.

Furthermore, operation 304 may additionally include reproducing the vulnerability and/or determining a root cause of the vulnerability. Examples of reproducing the vulnerability and determining a root cause of the vulnerability will be described in more detail during reference to FIG. 4. Once the root cause is determined, a vector of the vulnerability may be recorded. Optionally, the vector may be in the same form as the object in which the vulnerability is located. For example, if the vulnerability is in the header of an image file, the vector may be a file. Further, if the vulnerability is in a network service, the vector may be a network, etc. Table 1 illustrates various data the vector may include.

TABLE 1

Location of the vulnerable code
    Name of executable
        Short description of location in vulnerable product in
        which vulnerable executable is implemented
Possible input vectors that are capable of exploiting the
vulnerable code.
Root cause information The root cause determined with respect to operation 304 may also be utilized for creating a detection algorithm for detecting subsequent unwanted data. Such detection algorithm will be described in further detail during reference to FIG. 4. After at least one host interface is identified in operation 304, data sent to the interface is analyzed in order to determine whether the data is unwanted, as shown in operation 306. In the context of the present description, the unwanted data may include any malicious data, such as viruses, worms, Trojan horses, spyware, etc., and/or any other data and/or code that is unwanted. With the knowledge of the location of the vulnerable code from operations 302 and 304, it may be determined whether the data is unwanted. For example, the data may be determined to be unwanted if it attempts to access the vulnerable code.

In an embodiment where a plurality of host interfaces are identified in operation 304, as described above, only the closest host interface may be analyzed in operation 306. Of course, any number of the host interfaces may be analyzed in operation 306, as desired.

As an option, the collecting, identifying and analyzing of operations 302-306 may be disabled at any time. In addition, if it is determined in operation 306 that the data is unwanted, an event may be initiated. Such event may include, but is not limited to preventing the data from accessing the at least one host interface, creating a software exception, suspending a thread executing the data, terminating execution of a process associated with the data, and/or any other type of desired event.

Furthermore, the information collected in operations 302-306 may be utilized for implementing a system that intercepts calls made to the interface identified in operation 304 and further invokes a function to validate such calls each time they are made. Such a system may be included in any intrusion prevention or detection system. In addition, the system may report attempts to exploit vulnerabilities. In this way, it is not necessary for a patch to be distributed and installed at each computer utilizing the software application, while up-to-date protection may still be provided that efficiently addresses newfound vulnerabilities. Of course, physical patching may be used in combination with the aforementioned virtual patching, as desired.

More illustrative information will now be set forth regarding various optional architectures and features with which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
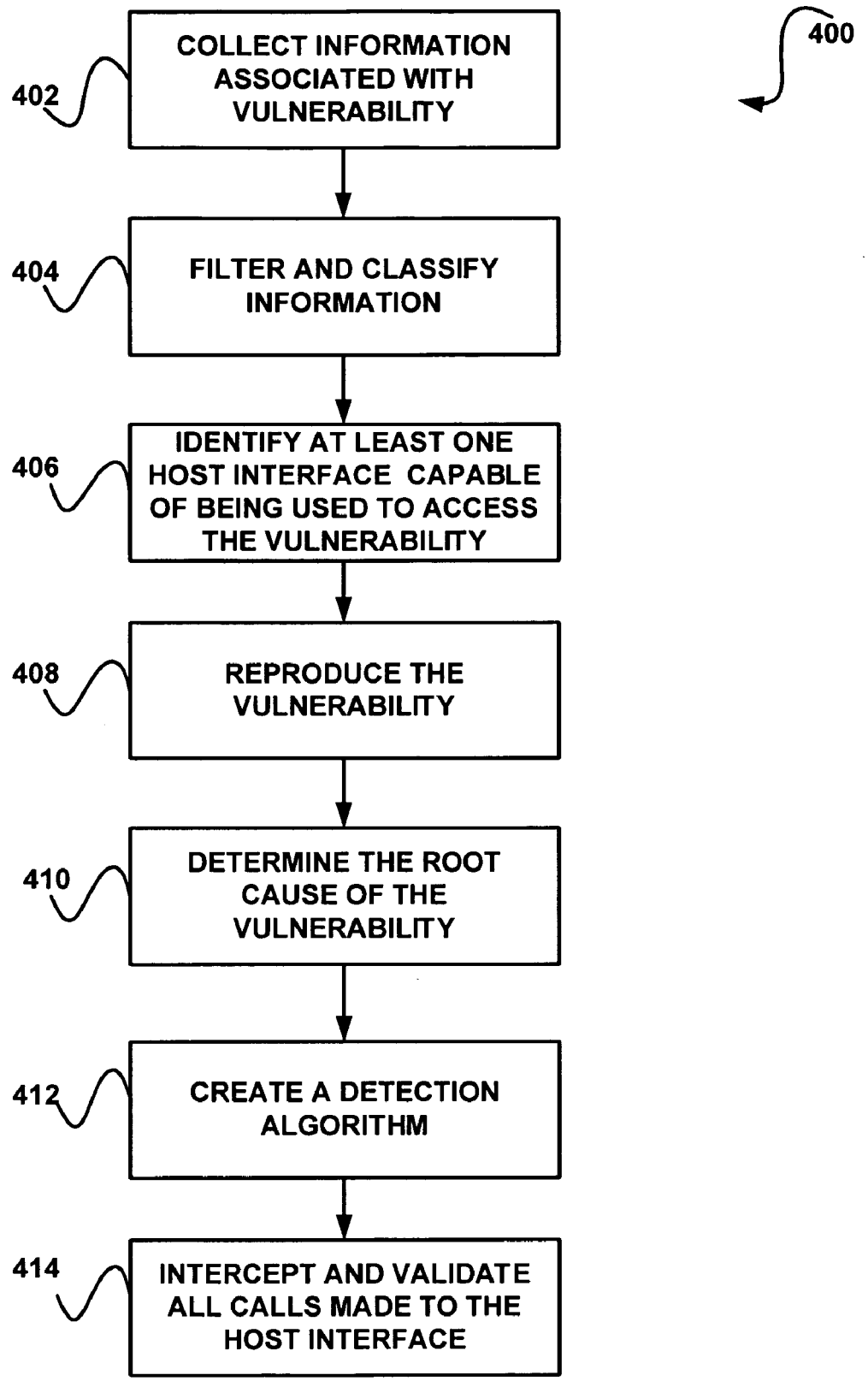
FIG. 4 shows a method for virtual patching, in accordance with another embodiment.

FIG. 4 shows a method for virtual patching, in accordance with another embodiment. As an option, the present method 400 may be implemented in the context of the architecture and environment of FIGS. 1-3. Of course, however, the method 400 may be carried out in any desired environment.

Initially, information associated with at least one vulnerability of a computer application may be collected, as shown in operation 402. Such information may be collected in any manner, such as, for example, that described with respect to operation 302 of FIG. 3. Information associated with the vulnerability may then be filtered and classified, as in operation 404.

Filtering the information collected in operation 404 may include identifying a vulnerability name, severity level and/or affected platform of the vulnerability. Of course, any other such information associated with the information collection in operation 402 may be identified by way of a filter. In this way, only information pertinent to the vulnerability and/or the cause of the vulnerability is available after collection. As another option, the collected information of operation 402 may be utilized for classifying the vulnerability. Such classification may be made according to a severity of the vulnerability, vulnerable products, etc.

At least one host interface that is capable of being used to access the vulnerability may then be identified, as indicated in operation 406. Such host interface may be identified in any desired manner. One optional example may be that described with respect to operation 304 of FIG. 3.

The vulnerability may then be reproduced, as illustrated in operation 408. As described hereinabove, such vulnerability may be reproduced utilizing a debugger, by simply executing an executable file leading to the vulnerability, or by any other mechanism capable of reproducing the vulnerability. A specific example of vulnerability reproduction may include installing the operating system version and/or product version related to the vulnerability, and utilizing the information collected in operation 402 for exploiting the vulnerability.

A root cause analysis may then be carried out in order to determine the root cause of the vulnerability, as in operation 410. A root cause of the vulnerability may be determined utilizing the identification of the vulnerable code, as described with respect to FIG. 3. Just by way of example, the root cause may be any function in code that provides access to a computer system.

Then, the root cause may be utilized in creating a detection algorithm, as in operation 412. For example, such detection algorithm may include any type of signature or may simply include a blueprint for creating any such signature, for use with a desired system [e.g. Host Intrusion Prevention System (HIPS), Network Intrusion Prevention System (NIPS), etc.].

Finally, as yet another option, all calls attempting to access the host interface may be intercepted and validated before being allowed to proceed via the host interface, as shown in operation 414. This option may be included in any intrusion prevention or detection system. In addition, it may report attempts to exploit vulnerabilities.

Again, it is not necessary for a patch to be distributed and installed at each computer utilizing the software application, since the vulnerability is not required to be fixed in order to protect the computer system. Instead, known vulnerabilities are utilized for validating calls made to the vulnerable code. Therefore, up-to-date protection is provided which efficiently addresses newfound vulnerabilities.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method to be performed in conjunction with a processor configured for executing non-transitory instructions stored in a memory, the method comprising:
   collecting information associated with at least one vulnerability of a computer application;
   identifying at least one host interface that is capable of being used to access the vulnerability of the computer application;
   analyzing data sent to the at least one host interface that was identified to determine whether the data is unwanted, wherein the identifying includes reproducing the vulnerability of the computer application, and determining a root cause of the vulnerability of the computer application, wherein a vector that is associated with the root cause is recorded, and wherein the vector is provided in a same form as an object in which the vulnerability is located; and
   creating a detection algorithm, which is based on the root cause, to be used in detecting subsequent unwanted data instances.

2. The method of claim 1, wherein the information is collected from a software patch.

3. The method of claim 1, further comprising initiating an event if the data is determined to be unwanted.

4. The method of claim 3, wherein the event includes preventing the data from accessing the at least one host interface that was identified.

5. The method of claim 3, wherein the event includes creating a software exception.

6. The method of claim 3 wherein the event includes suspending a thread executing the data.

7. The method of claim 3, wherein the event includes terminating execution of a process associated with the data.

8. The method of claim 1, wherein the information includes public information.

9. The method of claim 1, wherein the information is collected utilizing black box testing.

10. The method of claim 1, wherein the information is collected utilizing binary differentiation.

11. The method of claim 1, wherein the at least one host interface is identified utilizing a debugger.

12. The method of claim 1, wherein the at least one host interface is identified utilizing a static analysis.

13. The method of claim 1, wherein a closest host interface is identified and only data sent to the closest host interface is analyzed, when a plurality of the host interfaces is identified.

14. The method of claim 1, wherein the collecting, identifying and analyzing are capable of being disabled.

15. The method of claim 1, wherein the collecting includes:
   filtering the information; and
   classifying the information.

16. The method of claim 15, wherein the filtering includes identifying at least one of a vulnerability name, a severity level, and an affected platform.

17. The method of claim 1, wherein the at least one host interface includes a function that serves as an access point to the vulnerability of the computer application.

18. The method of claim 1, further comprising intercepting all calls attempting to access the at least one host interface, and validating each call before allowing the call to proceed via the at least one host interface.

19. A computer program product embodied on a non-transitory computer readable medium for performing operations, the operations comprising:
   collecting information associated with at least one vulnerability of a computer application;
   identifying at least one host interface that is capable of being used to access the vulnerability of the computer application, utilizing a processor; and
   analyzing data sent to the at least one host interface that was identified to determine whether the data is unwanted, wherein the identifying includes reproducing the vulnerability of the computer application, and determining a root cause of the vulnerability of the computer application, wherein a vector that is associated with the root cause is recorded, and wherein the vector is provided in a same form as an object in which the vulnerability is located; and
   creating a detection algorithm, which is based on the root cause, to be used in detecting subsequent unwanted data instances.

20. A system, comprising:
   a processor configured for executing non-transitory instructions stored in a memory, wherein the system is configured for:
   collecting information associated with at least one vulnerability of a computer application;
   identifying at least one host interface that is capable of being used to access the vulnerability of the computer application, wherein the system is operable such that data sent to the at least one host interface that was identified is analyzed to determine whether the data is unwanted, wherein the system is operable such that the identifying includes reproducing the vulnerability of the computer application, and determining a root cause of the vulnerability of the computer application, wherein a vector that is associated with the root cause is recorded, and wherein the vector is provided in a same form as an object in which the vulnerability is located; and
   creating a detection algorithm, which is based on the root cause, to be used in detecting subsequent unwanted data instances.

21. A method to be performed in conjunction with a processor configured for executing non-transitory instructions stored in a memory, the method comprising:
   collecting information associated with at least one vulnerability of a computer application, including filtering the information and classifying the information;
   identifying at least one host interface that is capable of being used to access the vulnerability of the computer application, utilizing a processor, the vulnerability of the computer application being reproduced and a root cause analysis being performed to identify the at least one host interface, wherein a vector that is associated with the root cause is recorded, and wherein the vector is provided in a same form as an object in which the vulnerability is located;

analyzing data sent to the at least one host interface that was identified to determine whether the data is unwanted, based on the information; and creating a detection algorithm, which is based on the root cause, to be used in detecting subsequent unwanted data instances.

* * * * *